US010708230B2

(12) United States Patent
Huang et al.

(10) Patent No.: US 10,708,230 B2
(45) Date of Patent: Jul. 7, 2020

(54) SYSTEMS AND METHODS FOR FIREWALL CONFIGURATION USING BLOCK LISTS

(71) Applicant: ServiceNow, Inc., Santa Clara, CA (US)

(72) Inventors: Sangshu Huang, San Diego, CA (US); John Gerald Ferguson, San Francisco, CA (US); Kurt Zettel, Nashville, TN (US)

(73) Assignee: ServiceNow, Inc., Santa Clara, CA (US)

( * ) Notice: Subject to any disclaimer, the term of this patent is extended or adjusted under 35 U.S.C. 154(b) by 195 days.

(21) Appl. No.: 16/008,964

(22) Filed: Jun. 14, 2018

(65) Prior Publication Data

US 2019/0386960 A1     Dec. 19, 2019

(51) Int. Cl.
*H04L 29/06* (2006.01)
*H04L 12/24* (2006.01)
*H04L 29/08* (2006.01)

(52) U.S. Cl.
CPC ...... *H04L 63/0263* (2013.01); *H04L 41/0803* (2013.01); *H04L 63/0236* (2013.01); *H04L 63/101* (2013.01); *H04L 63/20* (2013.01); *H04L 67/02* (2013.01)

(58) Field of Classification Search
None
See application file for complete search history.

(56) References Cited

U.S. PATENT DOCUMENTS

| 6,212,558 B1 * | 4/2001 | Antur | H04L 41/0893 709/203 |
| 6,243,815 B1 * | 6/2001 | Antur | H04L 41/0806 709/220 |
| 7,380,171 B2 * | 5/2008 | Prescott | G06F 11/0748 714/38.11 |

(Continued)

FOREIGN PATENT DOCUMENTS

| GB | 2317539 | * | 3/1998 |
| WO | WO199715008 | * | 4/1997 |

OTHER PUBLICATIONS

U.S. Appl. No. 62/568,087, filed Oct. 4, 2017, Amradkar et al.

(Continued)

*Primary Examiner* — Piotr Poltorak
(74) *Attorney, Agent, or Firm* — Fletcher Yoder PC

(57) ABSTRACT

The present disclosure relates generally to firewall configuration management, and, more specifically, to managing firewall configurations using dynamically generated block lists. A computer-implemented method includes adding an entry as a record in a block list entries table and associating the entry with a block list in a block list table and with an observable in an observables table. The method also includes activating the entry in the block list entries table to allow or block subsequent occurrences of the observable on a client network. The method further includes receiving a request for the block list from a firewall disposed on the client network and, in response, generating the block list from activated entries in the block list table and block list entries table and sending the block list to the firewall, wherein the firewall is configured to allow or block network traffic associated with the observable on the client network in accordance with the block list.

19 Claims, 12 Drawing Sheets

(56) References Cited

U.S. PATENT DOCUMENTS

| | | | |
|---|---|---|---|
| 7,636,937 B1* | 12/2009 | Bhattacharya | H04L 63/0263 709/223 |
| 8,108,495 B1* | 1/2012 | Zuk | H04L 12/4679 709/220 |
| 8,832,652 B2 | 9/2014 | Mueller et al. | |
| 9,106,705 B1* | 8/2015 | Tuttle | H04L 63/20 |
| 9,118,720 B1 | 8/2015 | Raman et al. | |
| 9,363,252 B2 | 6/2016 | Mueller et al. | |
| 9,461,882 B1* | 10/2016 | Jenkins | H04L 41/0803 |
| 9,645,833 B2 | 5/2017 | Mueller et al. | |
| 9,710,644 B2 | 7/2017 | Reybok et al. | |
| 10,282,193 B1* | 5/2019 | Lanner | H04L 67/34 |
| 10,305,911 B1* | 5/2019 | Eyre | H04L 63/102 |
| 10,333,960 B2 | 6/2019 | Zettel, II et al. | |
| 10,341,298 B1* | 7/2019 | Lichtenberg | H04L 63/0263 |
| 10,503,727 B2* | 12/2019 | Laethem | G06F 16/1873 |
| 2002/0032646 A1* | 3/2002 | Sweeney | G06Q 40/02 705/38 |
| 2002/0032766 A1* | 3/2002 | Xu | H04L 29/06 709/223 |
| 2003/0118038 A1* | 6/2003 | Jalava | H04L 63/0263 370/401 |
| 2003/0120955 A1* | 6/2003 | Bartal | H04L 41/0893 726/4 |
| 2003/0167410 A1* | 9/2003 | Rigstad | H04L 63/0227 726/1 |
| 2003/0208472 A1* | 11/2003 | Pham | H04L 29/06 |
| 2004/0030697 A1* | 2/2004 | Cochran | G06F 16/95 |
| 2004/0223495 A1* | 11/2004 | Pachl | H04L 41/0893 370/395.31 |
| 2004/0225541 A1* | 11/2004 | Porter | G06Q 10/063 705/70 |
| 2005/0060412 A1* | 3/2005 | Chebolu | H04L 63/102 709/227 |
| 2005/0138416 A1* | 6/2005 | Qian | H04L 63/08 726/4 |
| 2005/0198283 A1* | 9/2005 | Ramamoorthy | H04L 41/0266 709/225 |
| 2006/0041935 A1* | 2/2006 | Conley | H04L 63/0227 726/11 |
| 2006/0184792 A1* | 8/2006 | Berlin | G06F 21/51 713/165 |
| 2007/0209058 A1* | 9/2007 | Anantharamiah | H04L 41/0806 726/1 |
| 2008/0134177 A1* | 6/2008 | Fitzgerald | G06F 21/51 718/1 |
| 2008/0235755 A1* | 9/2008 | Blaisdell | H04L 63/0227 726/1 |
| 2009/0172800 A1* | 7/2009 | Wool | G06F 21/604 726/11 |
| 2009/0228972 A1* | 9/2009 | Bandi | G06F 21/54 726/14 |
| 2009/0249472 A1* | 10/2009 | Litvin | H04L 63/0263 726/14 |
| 2009/0328187 A1* | 12/2009 | Meisel | H04L 63/0218 726/13 |
| 2010/0205215 A1 | 8/2010 | Cook et al. | |
| 2010/0333165 A1* | 12/2010 | Basak | H04L 63/0218 726/1 |
| 2013/0139247 A1* | 5/2013 | Cianfrocca | H04L 63/02 726/14 |
| 2013/0174210 A1* | 7/2013 | Park | G06F 21/53 726/1 |
| 2014/0245423 A1* | 8/2014 | Lee | H04L 63/0218 726/12 |
| 2015/0040246 A1* | 2/2015 | Yuen | H04L 63/168 726/30 |
| 2015/0082417 A1* | 3/2015 | Bhagwat | H04L 63/0263 726/13 |
| 2015/0207813 A1* | 7/2015 | Reybok | H04L 63/145 726/22 |
| 2015/0237013 A1* | 8/2015 | Bansal | H04L 63/0263 726/13 |
| 2016/0277411 A1* | 9/2016 | Dani | H04L 63/20 |
| 2016/0378956 A1* | 12/2016 | Borkar | G06F 21/10 726/1 |
| 2017/0006082 A1* | 1/2017 | Shishodia | H04L 63/1441 |
| 2017/0171231 A1 | 6/2017 | Reybok, Jr. et al. | |
| 2017/0250989 A1* | 8/2017 | Bhattacharya | H04L 63/104 |
| 2017/0272469 A1 | 9/2017 | Kraemer et al. | |
| 2018/0234463 A1* | 8/2018 | Briski | H04L 63/205 |
| 2018/0324207 A1 | 11/2018 | Reybok, Jr. et al. | |
| 2019/0102560 A1 | 4/2019 | Zettel, II et al. | |
| 2019/0268354 A1 | 8/2019 | Zettel, II et al. | |
| 2019/0273720 A1* | 9/2019 | Cloud | H04L 63/0236 |
| 2019/0319953 A1* | 10/2019 | Lear | H04L 63/20 |
| 2019/0386960 A1 | 12/2019 | Huang et al. | |

OTHER PUBLICATIONS

U.S. Appl. No. 16/100,464, filed Aug. 10, 2018, Brotherton et al.
U.S. Appl. No. 16/368,690, filed Mar. 28, 2019, Madhavan et al.
U.S. Appl. No. 16/554,218, filed Aug. 28, 2019, Zettel, II et al.
PAN-OS® 8.1 Administrator's Guide, TechDOCS, Published May 21, 2018, Accessed Jun. 14, 2018, pp. 1-1124, https://www.paloaltonetworks.com/content/dam/pan/en_US/assets/pdf/technical-documentation/81/pan-os/pan-os-admin/pan-os-admin.pdf.

* cited by examiner

FIREWALL BL ENTRY
63.247.78.227

* ENTRY VALUE: 63.247.78.227
OBSERVALBE: 63.247.78.227
INCIDENT COUNT: 1
* OBSERVABLE TYPE: IP ADDRESS (V4)
OVERRIDE FINDING AND SOURCE: ☐
FINDING: MALICIOUS
FINDING SOURCE: HYBRID ANALYSIS
BLOCK LIST: MALICIOUS IPs
SUBMISSION NOTES:

STATUS: ADDED
ACTIVE: ☑
ADDED DATE: 2018-05-25 12:29:19
EXPIRATION PERIOD (DAYS): 30
EXPIRED DATE: 2018-06-24 12:29:19

ACTIVITIES: 2
SECURITY ADMIN — COMMENTS – 2018-05-25 12:29:20
THE REQUEST TO SUBMIT CURRENT ENTRY IS APPROVED.

SECURITY ADMIN — COMMENTS – 2018-05-25 12:28:06
BLOCK VALUE:63.247.78.227 IS REQUESTED TO BE ADDED TO THE BL MALICIOUS IPS.

OBSERVABLE
63.247.78.227

SELECT SECURITY TAG ⇕ | HYBRID ANALYSIS – POTENTIAL THREAT ⊙ | BL-MALICIOUS IPs ⊙

*— 222*

* VALUE: 63.247.78.227

OBSERVABLE TYPE: IP ADDRESS (V4)

IS COMPOSITION: ☐

* FINDING: MALICIOUS

NOTES:

INCIDENT COUNT: 1

MUST NOT BE PRESENT: ☐

LOCATION:

UPDATE | DELETE

SYSTEMS AND METHODS FOR FIREWALL CONFIGURATION USING BLOCK LISTS

BACKGROUND

The present disclosure relates generally to firewall configuration management, and, more specifically, to managing firewall configurations using dynamically generated block lists (BLs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Internet-connected enterprise computer networks such as those described above are frequently subjected to malicious traffic. As such, these networks are often protected by at least one firewall, which acts as a gatekeeper that regulates traffic into and out of a network based on a predefined set of rules. Firewalls can blacklist and block traffic to and from particular internet protocol (IP) addresses or ranges, uniform resource locators (URLs), and domains. Additionally, firewalls can whitelist particular IP addresses, URLs, and domains to explicitly allow traffic that might otherwise be misconstrued for malicious traffic and blocked. It may be appreciated that a large enterprise may have tens to hundreds of firewalls deployed on networks worldwide, which can make configuration and management of these firewalls challenging.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure is directed toward a system and method for dynamically generating block lists (BLs) in an on-demand fashion within a client instance. The disclosed system enables a user (e.g., a security operator or technician) to request that a particular observable be blocked or allowed on a client network, which generates a new block list entry in a database associated with the client instance. In certain embodiments, a second user having a different security role (e.g., a security administrator) subsequently approves and activates the block list entry. When the firewall of a client network requests an updated block list from the client instance, the disclosed system responds by dynamically generating an updated block list based on currently active block list entries, and then sending the block list to the firewall for implementation. The disclosed system further includes a validation mechanism to avoid erroneous or redundant block list entries, as well as an expiration mechanism to ensure that block list entries are suitable retired. As such, by centrally generating block lists at the client instance, any number of client firewalls on different networks of the client may easily managed, enabling agile and consistent response to emerging threats.

BRIEF DESCRIPTION OF THE DRAWINGS

Various aspects of this disclosure may be better understood upon reading the following detailed description and upon reference to the drawings in which:

FIGS. 7, 8, 9, 10, and 11 illustrate simulated screenshots of a graphical user interface (GUI) presented on a client device during the creation and approval process of FIG. 6, in accordance with embodiments of the present technique.

DETAILED DESCRIPTION OF SPECIFIC EMBODIMENTS

Figure 1:
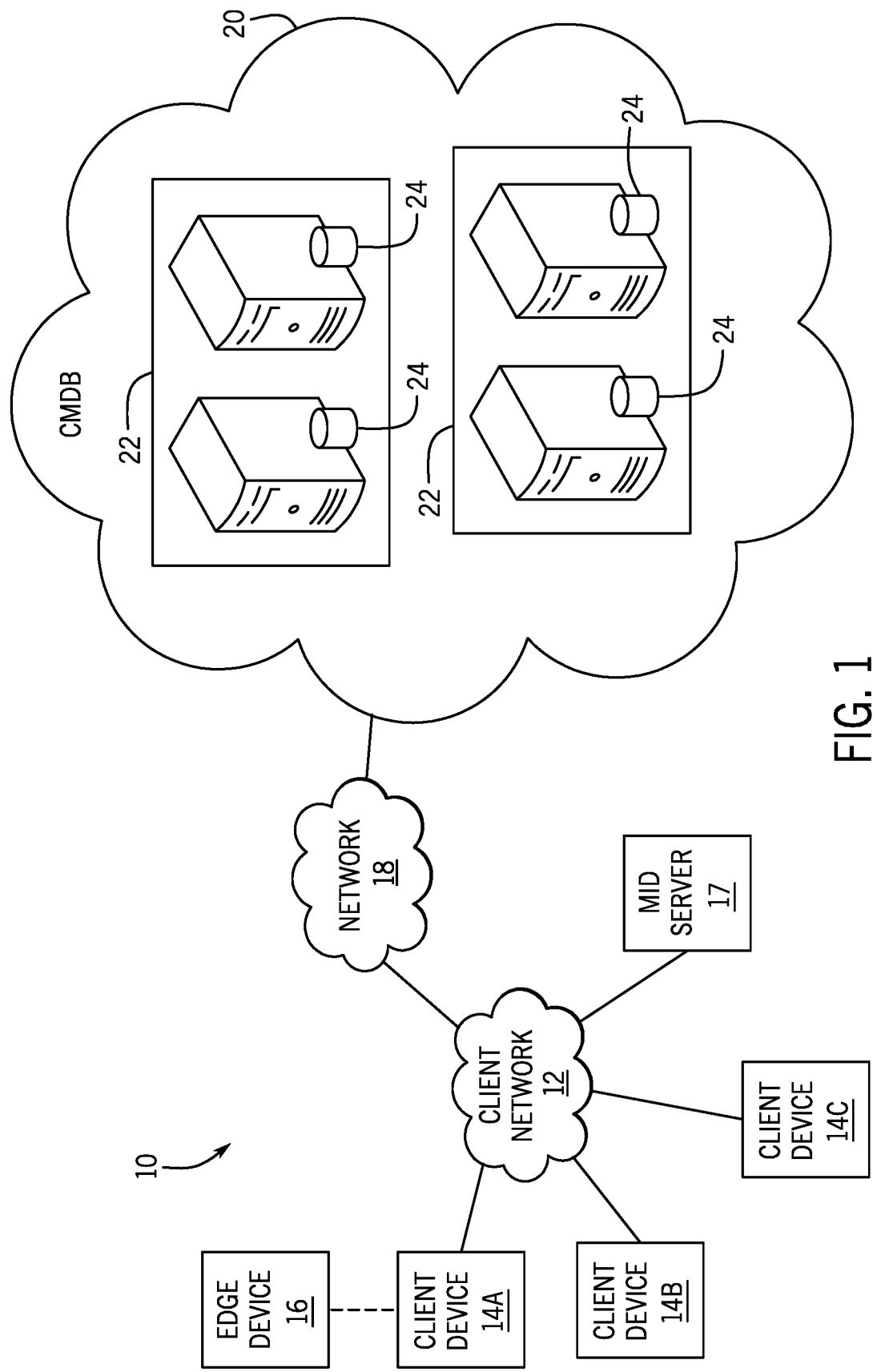
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" or "engine" refers to one or more computing modules, programs, processes, workloads, threads and/or a set of computing instructions executed by a computing system. Example embodiments of an application include software modules, software objects, software instances and/or other types of executable code.

As used herein, the term "observable" or "indicator" refers to an internet protocol (IP) address or range, a uniform resource locator (URL), or a domain. As used herein, the term "firewall" refers to a device designed and configured to block or allow particular traffic on a client network. For example, the firewalls discussed herein include computing systems that store and execute particular instructions to regulate traffic on the customer network. As used herein, the term "block list" or "BL" refers to a dynamically generated text-based list of observables in the form of a blacklist (or whitelist) that instructs a firewall to block (or not to block) occurrences of the observables on the client network. As discussed below, each block list generally includes only one type of observable (e.g., IP addresses or ranges, URLs, or domains).

One manner in which certain firewalls can be configured to block or allow specific observables is via block lists (BLs). Block lists are generally text-based files that can be downloaded by the firewall and include instructions to block or allow certain observables on a client network. For example, a firewall may include a security profile that indicates that the firewall should implement the instructions indicated in a particular block list from a particular source, such as a particular online server.

With this in mind, present embodiments are directed toward a system and method for generating block lists within a client instance. The disclosed system can enable the collection of information at the client instance regarding observables detected in client network traffic. The system enables a user to request that a particular observable be blocked or allowed, which generates a new block list entry record that can subsequently be activated. When the firewall of a client network requests an updated block list from the client instance, the system responds by dynamically generating an updated block list based on active block list records and sending these to the firewall for implementation. As such, by centrally generating block lists at the client instance, any number of client firewalls on different networks of the client may easily managed, enabling agile and consistent response to emerging threats.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20.

Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
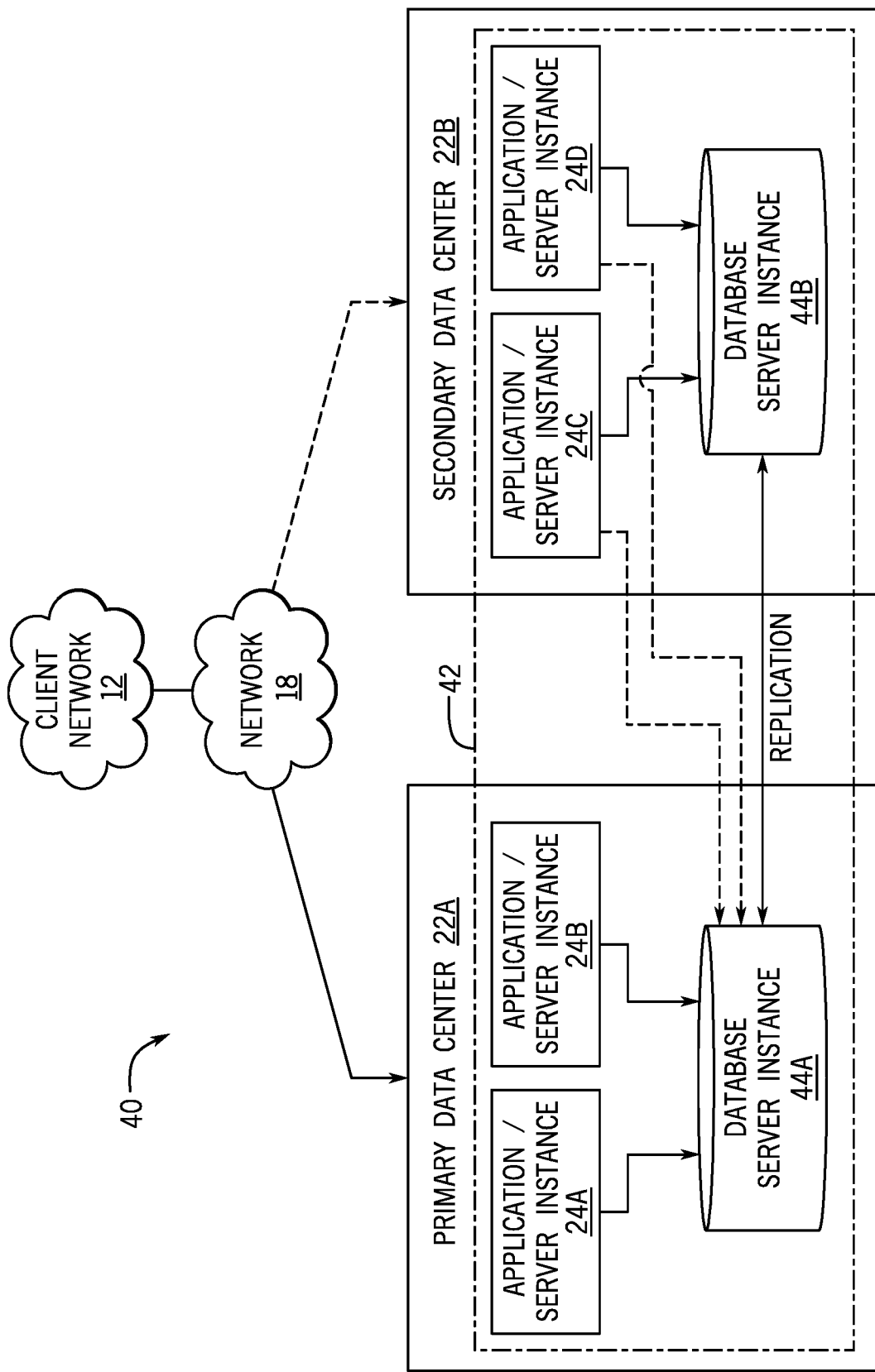
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
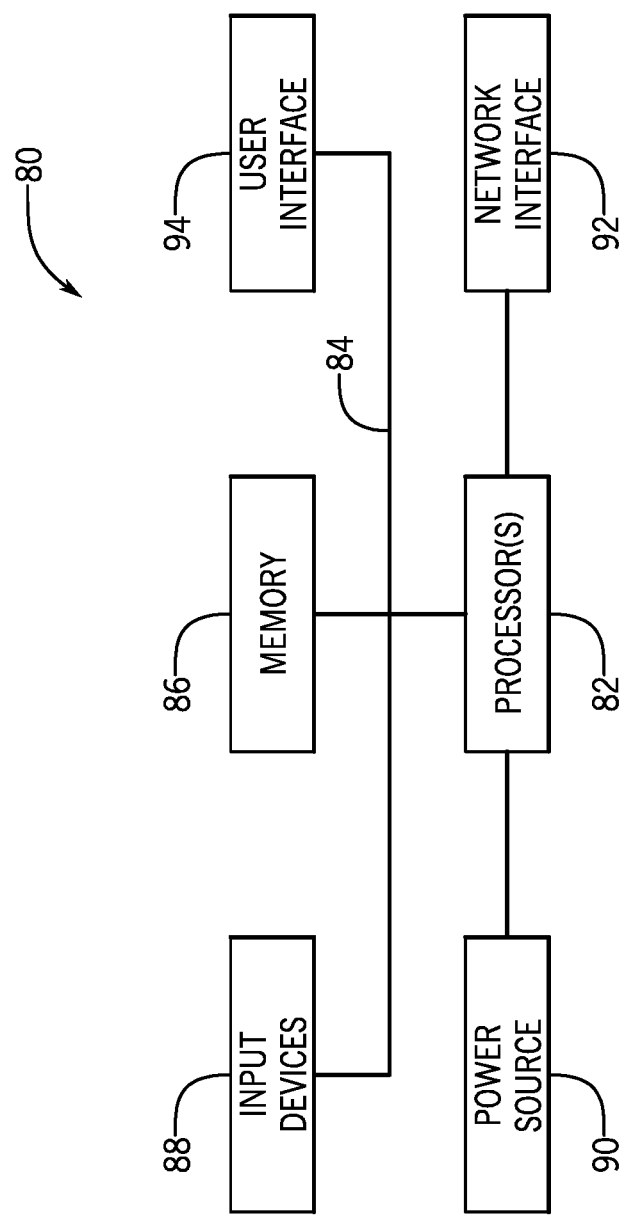
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
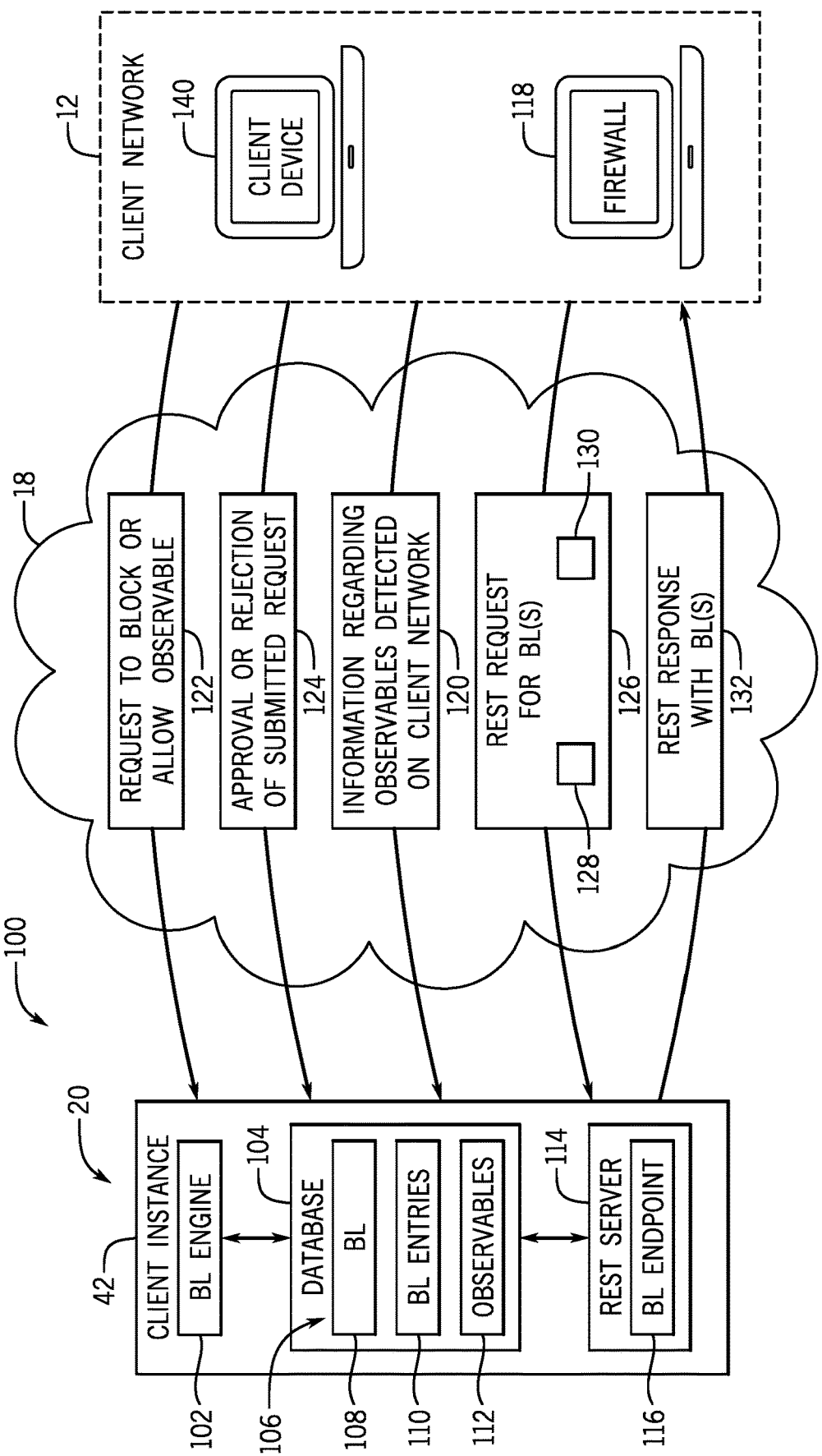
FIG. 4 is a schematic diagram of an embodiment of a block list (BL) system for managing the configuration of firewalls disposed on client networks, in accordance with embodiments of the present technique.

With the foregoing in mind, FIG. 4 illustrates an embodiment of a block list system 100 for managing firewalls disposed on client networks 12, in accordance with embodiments of the present technique. More specifically, FIG. 4 illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. Cloud provider infrastructures are generally configured to support a plurality of end-user devices, such as client device 14D, concurrently, wherein each end-user device is in communication with the single client instance 42. Also, cloud provider infrastructures may be configured to support any number of client instances, such as client instance 42, concurrently, with each of the instances in communication with one or more end-user devices. As mentioned above, an end-user may also interface with client instance 42 using an application that is executed within a web browser.

For the embodiment illustrated in FIG. 4, the client instance 42 includes a block list engine 102, which is an application that includes instructions stored in a suitable memory (e.g., memory 86) and executable by a suitable processor (e.g., processor 82, data center 22) to generate and update block list entries, as discussed below. The illustrated client instance 42 is associated with a database 104 (e.g., database server instance 44A) including a number of tables 106 that store data within the block list system 100, including a block list table 108, a block list entries table 110, and an observables table 112. As discussed in greater detail below, each record of the block list table 108 represents a particular block list typically associated with a single firewall rule or policy, while each record of the block list entries table 110 represents a particular entry or line item within a block list. The observables table 112 includes information regarding observables that have been detected on the client network 12 or have interacted with systems on the client network 12 and have been identified by other sources, such as a threat identification or alert service (e.g., HybridAnalysis™, PHISHTANK®) as being potentially malicious. It may be appreciated that the database 104 may include other tables that are related to the illustrated tables 106, such as a security incidents table mentioned below.

The illustrated client instance 42 also includes a Representational State Transfer (REST) server 114 that facilitates the exchange of information between the client instance 42 and devices on the client network 12. In particular, the illustrated REST server 114 includes or hosts a block list endpoint 116. The block list endpoint 116 is a REST endpoint designed to receive authorized REST requests for block lists, and to provide corresponding REST responses that include these block lists, wherein the block lists are dynamically generated from active records stored in the block list table 108 and the block list entries table 110, as discussed below.

The illustrated client instance 42 is communicatively coupled to a client network 12 via the network 18. While a single client network is illustrated for simplicity, the client instance 42 can be communicatively coupled to any suitable number of client networks 12, in other embodiments. The illustrated client network 12 includes client device 14D and a firewall 118 in communication with the client instance 42. More specifically, in certain embodiments, the illustrated firewall detects observables in client network traffic during operation, and the firewall provides information 120 regarding these observables to the client instance 42, wherein the information is stored within the observables table 112 by the client instance 42.

Additionally, as illustrated, a user operating the client device 14D may submit a request 122 to create a block list entry to block or allow a particular observable on the client network 12. For example, as discussed below, the block list engine 102 at least generates a record in the block list entries table 110 based on the request 122, wherein the block list entry may be placed in an inactive state until an approval or rejection 124 is received from an authorized user account (e.g., a security admin operating the client device 14D). Once approved, the record in the block list entry table 110 is updated to activate the block list entry, as discussed in greater detail below.

The illustrated firewall 118 is configured to repeatedly request an updated block list from the client instance 42 on a regular interval (e.g., every 5 minutes, every 10 minutes). As such, at the appropriate time, the firewall 118 generates the REST request 126 for updates block lists from the client instance 42. Additionally, in certain embodiments, the REST request 126 may include one or more credentials to enable the firewall to access the block list endpoint of the client instance 42. In particular, the illustrated REST request includes server authentication credentials 128 (e.g., a certificate associated with the client instance) and client authentication credentials 130 (e.g., a username and password associated with a role in the client instance 42 having sufficient rights to access the block list endpoint 116). In response to receiving a valid and authenticated request at the block list endpoint 116, the client instance 42 generates block lists from active records stored in the block list table 108 and block list entries table 110, and provides a REST response 132 including the generated block lists to the firewall 118 of the client network 12.

Figure 5:
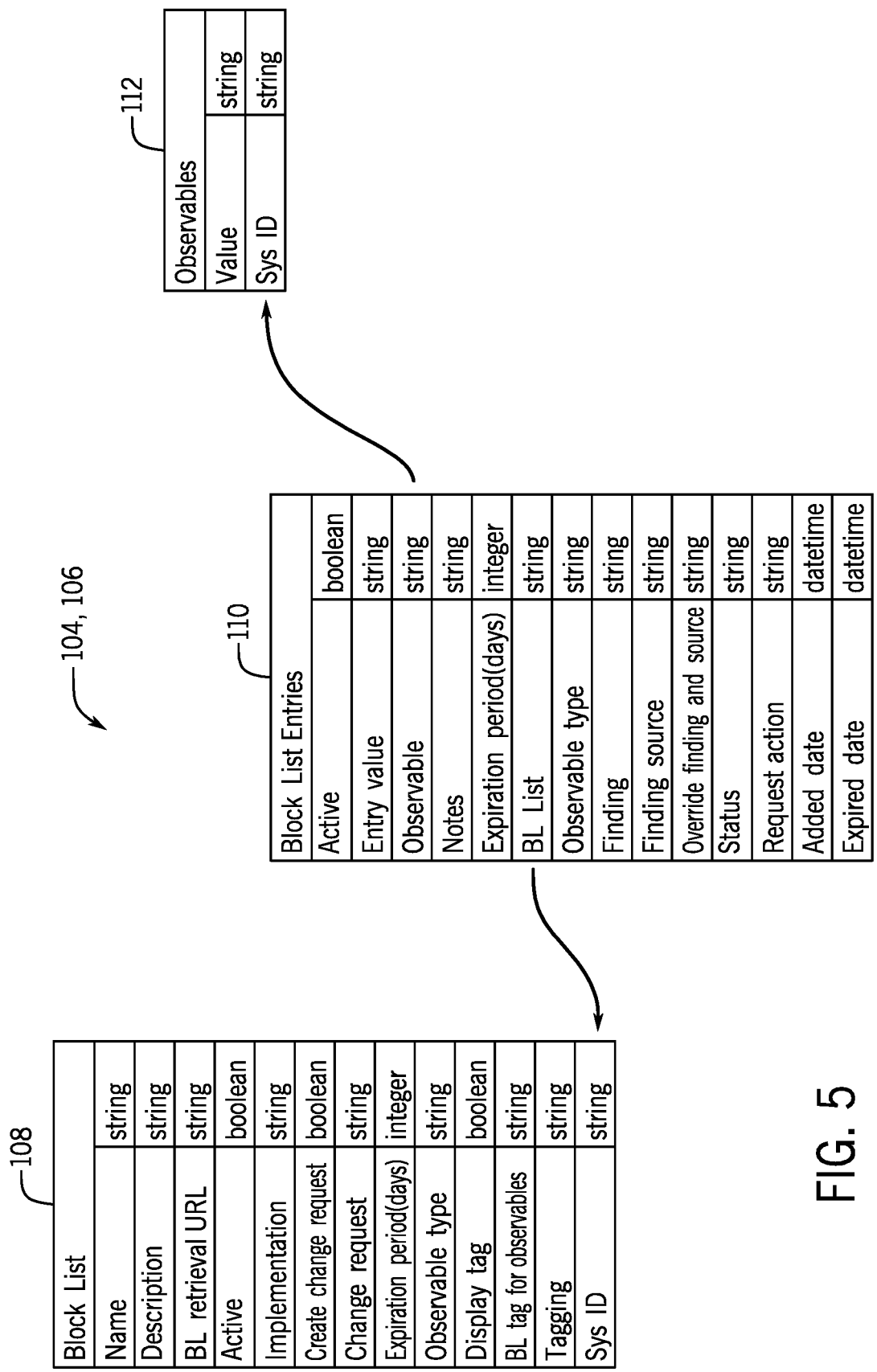
FIG. 5 is a schematic diagram illustrating the structure of tables within a database associated with the block list system of FIG. 4, in accordance with embodiments of the present technique.

FIG. 5 illustrates the structure of the block list table 108, the block list entries table 110, and the observables table 112 within the database 104, in accordance with an example embodiment of the present technique. As mentioned, each record of the block list table 108 represents a particular block list, while each record of the block list entries table 110 represents a particular entry within a block list. As such, there is a one-to-many relationship between the block list table 108 and the block list entries table 110, namely between the "BL list" field of the block list entries table 110 and the "Sys ID" field (e.g., the primary key) of the block list table 108. Additionally, each record in the block list entry may be associated with a particular record in the observables table 112. As such there is a one to one relationship between the block list entries table 110 and the observables table 112, namely between the "Observable" field of the block list entries table 110 and the "Sys ID" field (e.g., the primary key) of the observables table 112. For the illustrated embodiment, the observables table 112 includes a "Value" field that stores a string indicating a value (e.g., IP address or range, URL, domain) associated with each observable.

In the illustrated embodiment, the block list table 108 includes a number of fields that store information with respect to each block list, including a "Name" field and "Description" field. The illustrated block list table 108 includes an "BL retrieval URL" that defines a URL associated with the block list endpoint 116 from which the block list may be retrieved. The "Active" field stores a Boolean value that indicates whether or not the block list is active and, as such, whether the block list will be provided to the firewall 118 in response to the REST request 126. In certain embodiments, a block list having at least one corresponding entry in the block list entries table 110 will have an "Active" field value of true, while a block list having no active entries will have an "Active" field value of false. In other embodiments, the value stored in the "Active" field of a particular block list in the block list table 108 may be false while the block list is still open and available to add new entries, and may be true when the block list is closed and is no longer available to add/associate new block list entries. The illustrated block list table 108 includes audit fields (e.g., "Create change request", "Change request") to track changes to each block list. Since certain types of firewalls do not process block lists having mixed types, the illustrated block list table 108 also includes an "Observable type" field storing a value that indicates whether a block list is a IP-based, URL-based, or domain-based block list. Additionally, the illustrated block list includes tag-related fields (e.g., a "Display tag" field, a "BL tag for observables" field, a "Tagging" field) that store data related to whether and how to display tags when the observable record is viewed in a client user interface, as discussed below.

For the illustrated embodiment, the block list entries table 110 includes an "Active" field storing a Boolean value that indicates whether or not a block list entry is active, as discussed in greater detail below. The "Status" field stores a status of the block list entry, such as a "Pending" status for newly submitted block list entries and an "Added" status for approved block list entries that have been activated, as discussed below. The "Entry value" field stores the actual text of the block list entry that is included in the block lists generated by the block list engine and provided to the firewall 118. The "Expiration period(days)" field stores an integer value indicating a number of days that the block list entry will remain enforce after initial activation. Accordingly, the "Expired date" field stores an expiration date at which the block list entry expires, which is calculated based a "Added date" field value and the "Expiration period (days)" field value. The "Finding" field and "Finding Source" field store information related to the original indication (e.g., from a threat identification or alert service) that the block list entry should be created. While this data is generally imported from other database tables, there is also an "Override finding and source" field that can store a user-defined string describing the finding and source information. The "Request action" field stores information related to requests to modify (e.g., activate, deactivate) a block list entry.

Figure 6:
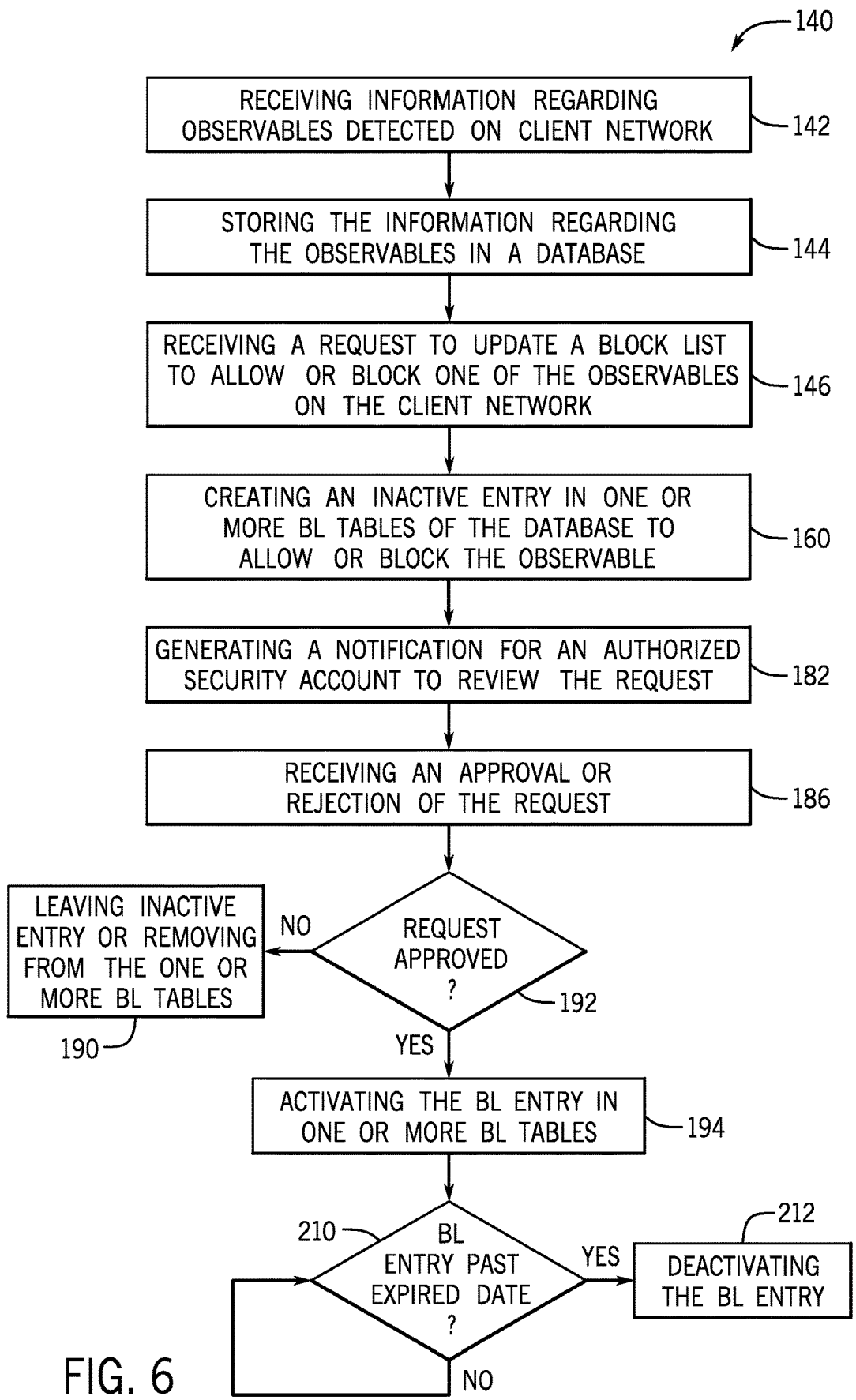
FIG. 6 is a flow diagram illustrating a process whereby a block list entry is created and approved, in accordance with embodiments of the present technique.
Figure 7:
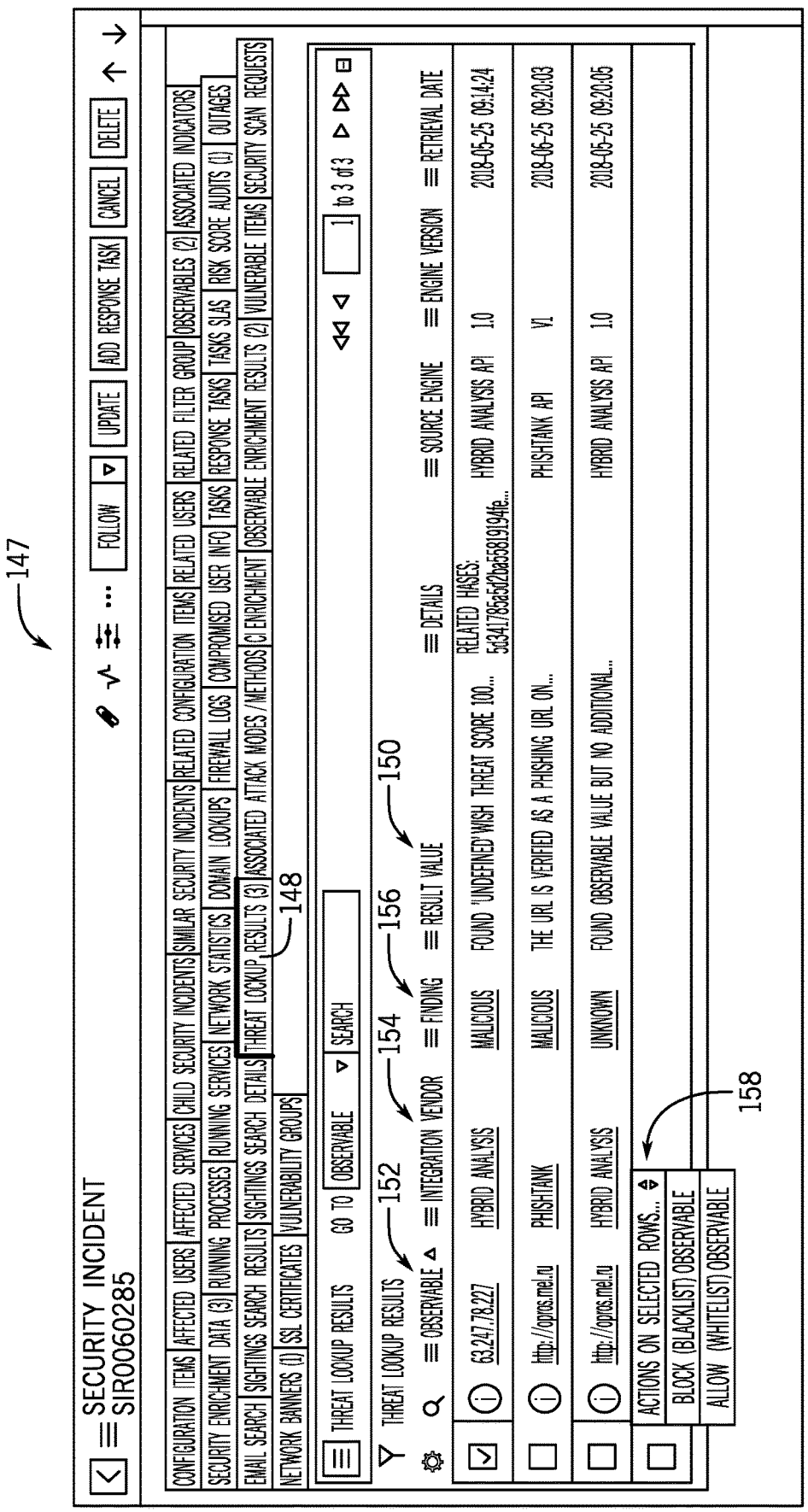

FIG. 6 is a flow diagram illustrating a process 140 whereby a block list entry is created and approved, in accordance with certain embodiments of the present approach. Certain steps of the process 140 are discussed with respect to the block list system 100 of FIG. 4. Additionally, FIGS. 7-11 illustrate simulated screenshots of a graphical user interface (GUI) presented on a client device (e.g., client device 14D) during the creation and approval process 140, and as such, reference will be made to these figures throughout the discussion of the process 140. In certain embodiments, the process 140 may be stored (e.g., as part of the block list engine 102 and/or the client instance 42) as instructions in a memory (e.g., memory 86) and executed by a processor (e.g., processor 82) of a suitable computing system (e.g., data center 22). Additionally, the illustrated process 140 is merely provided as an example, and in other embodiments, the process 140 may include fewer steps, additional steps, and/or steps in different orders than illustrated in FIG. 6.

The illustrated process 140 begins with the client instance 42 receiving (block 142) information regarding observables detected on the client network 12, and the client instance 42 storing (block 144) the information in the observables table 112 of the database 104. For example, as illustrated in FIG. 4, in certain embodiments, the firewall 118 may communicate via the network 18 to provide to the client instance 42 information 120 regarding observables detected on the client network 12 on regular intervals, or in response to detecting certain observables (e.g., high level threats). In certain embodiments, the observables table 112 may additionally or alternatively be populated with information regarding observables received from other sources (e.g., from a threat identification or alert service, manually entered). As such, in certain embodiments, blocks 142 and 144 may be skipped during the creation and activation of a block list entry.

Continuing through the embodiment of the process 140 illustrated in FIG. 6, at some point during operation, the client instance 42 receives (block 146) a request to block or allow an observable on the client network 12. In an example, a user having a suitable role (e.g., a security role) within the client instance 42 may be tasked with reviewing potential threats on the client network 12. Upon selecting a particular security incident to review, the user may be presented with the GUI 147 illustrated in FIG. 7. With a "Threat Lookup Results" tab 148 of the GUI 147 selected, a table 150 is illustrated that includes number of observables stored in the observables table 112 that are associated with the selected security incident. The illustrated "Observable" column 152 generally corresponds to the "Value" field in the observables table 112. Additionally, the "Integration Vendor" column 154 indicates a threat identification or alert service that provided the finding listed in the "Finding" column 156. For the illustrated example, the user selects a particular observable (as indicated by the selected checkbox) and then selects "Block (blacklist) observable" from the dropdown box 158, which sends the request 122 to generate a block list entry to the client instance 42.

Returning to the embodiment of the process 140 of FIG. 6, in response to receiving the request 122 to create the block list entry, the client instance 42 creates (block 160) an inactive entry in the block list entries table 110 based on the request 122. In certain situations, such as when the requested entry is the first in a new block list, the client instance 42 may also create a new record in the block list table 108 based on the request 122. In certain embodiments, the block list engine 102 validates the requested block list entry before it is created. For example, the block list engine 102 may ensure that the requested block list entry is not redundant with respect to an existing block list entry, ensure that the observable type (e.g., IP address or range, URL, or domain) of the block list and the block list entry match, and/or ensure that the observable is a properly formatted IP address or range (e.g., classless inter-domain routing (CIDR)), URL, or domain before creating a new entry in the block list entries table 110.

Figure 8:
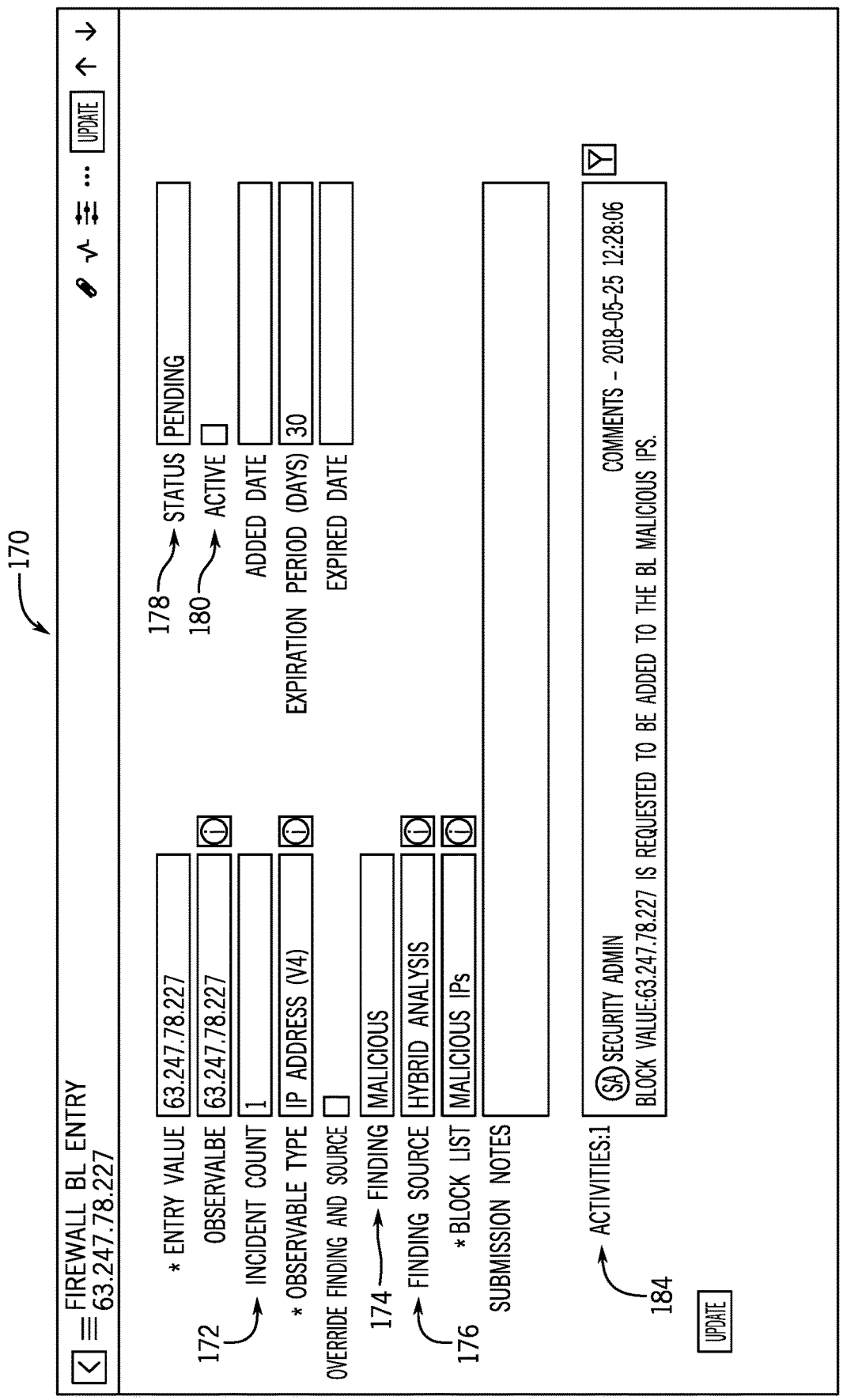

Continuing through the example above, the user may view the newly created block list entry via a GUI 170, as illustrated in FIG. 8. In addition to the fields discussed above with respect to the block list entries table 110 in FIG. 5, the GUI 170 includes an "Incident Count" field 172 having a calculated value that indicates a number of incidents (e.g., security incidents) that are associated with the illustrated block list entry. As noted, the values of a "Finding" field 174 and a "Finding source" field 176 in FIG. 8 are imported from the "Integration Vendor" column 154 and the "Finding" column 156 of FIG. 7, respectively. Additionally, for the example illustrated in FIG. 8, a "Status" field 178 indicates a "Pending" status and an "Active" checkbox 180 is not selected. In certain embodiments, the user that requests the creation of the block list entry may be associated with a suitable role (e.g., security administrator) to also activate the block list entry simply by selecting the "Active" checkbox.

In other embodiments, a first user associated with a first role (e.g., security operator or technician) may request the creation of the block list entry, and a second user associated with a second role (e.g., security administrator) may approve or reject the requested block list entry. This oversight and approval process can help to ensure that erroneous block list entries are not activated, as this can significantly impact the intended functionality of the client network 12 in a negative manner. Returning to FIG. 6, in certain embodiments, the client instance 42 may generate (block 182) a notification for a user that is associated with an authorized security role (e.g., security administrator) to review and then approve or reject the request. In certain embodiments, the notification may be similar to that indicated in an "Activities" section 184 of the GUI 170 of FIG. 8, which indicates the request to add the indicated IP address to a malicious IP addresses block list, as well as the user or role associated with the entry. In some embodiments, a user associated with a suitable role may view a different GUI or report that presents a table of pending block list entries that are awaiting review. Accordingly, returning to FIG. 6, the client instance 42 receives (block 186) approval or rejection of the block list entry from a user associated with a suitable role within the client instance 42.

In certain embodiments, until the block list entry is activated by the user associated with the suitable role, the block list entry may indefinitely remain inactive and pending, like the block list entry illustrated in FIG. 8. In other embodiments, if a block list entry is rejected or remains pending for a predetermined amount of time, the block list entry may be removed (block 190) from the block list entries table 110. As indicated by the decision block 192, if the client instance 42 receives approval of the block list entry (e.g., via selection of the "Active" checkbox illustrated in FIG. 8), the client instance 42 activates (block 194) the block list entry. FIG. 9 illustrates the GUI 170 after the block list entry illustrated in FIG. 8 has been activated. As illustrated, the "Status" field 178 indicates "Added", the "Active" checkbox 180 is selected, and the "Added Date" field 200 is populated.

Additionally, the "Expired Date" field 202 has been calculated based on the values of the "Added Date" field 200 and the "Expiration Period(days)" field 204. Furthermore, the "Activities" section 184 has been updated to include a notation 206 indicating that the block list entry has been approved, and the user account/role responsible for the activation. Returning to FIG. 6, after the block list entry is activated and the "Expired Date" is calculated, the client instance 42 may regularly review the block list entry to determine whether or not the "Expired Date" has been reached, as indicated by the decision block 210. When the "Expired Date" is reached, the client instance 42 deactivates (block 212) the block list entry. For example, this may involve updating the block list entry, such that the "Status" field 178 has a value of "Expired" and the "Active" checkbox is deselected, relative to the appearance of the block list entry in the GUI 170 of FIG. 9.

Figure 10:
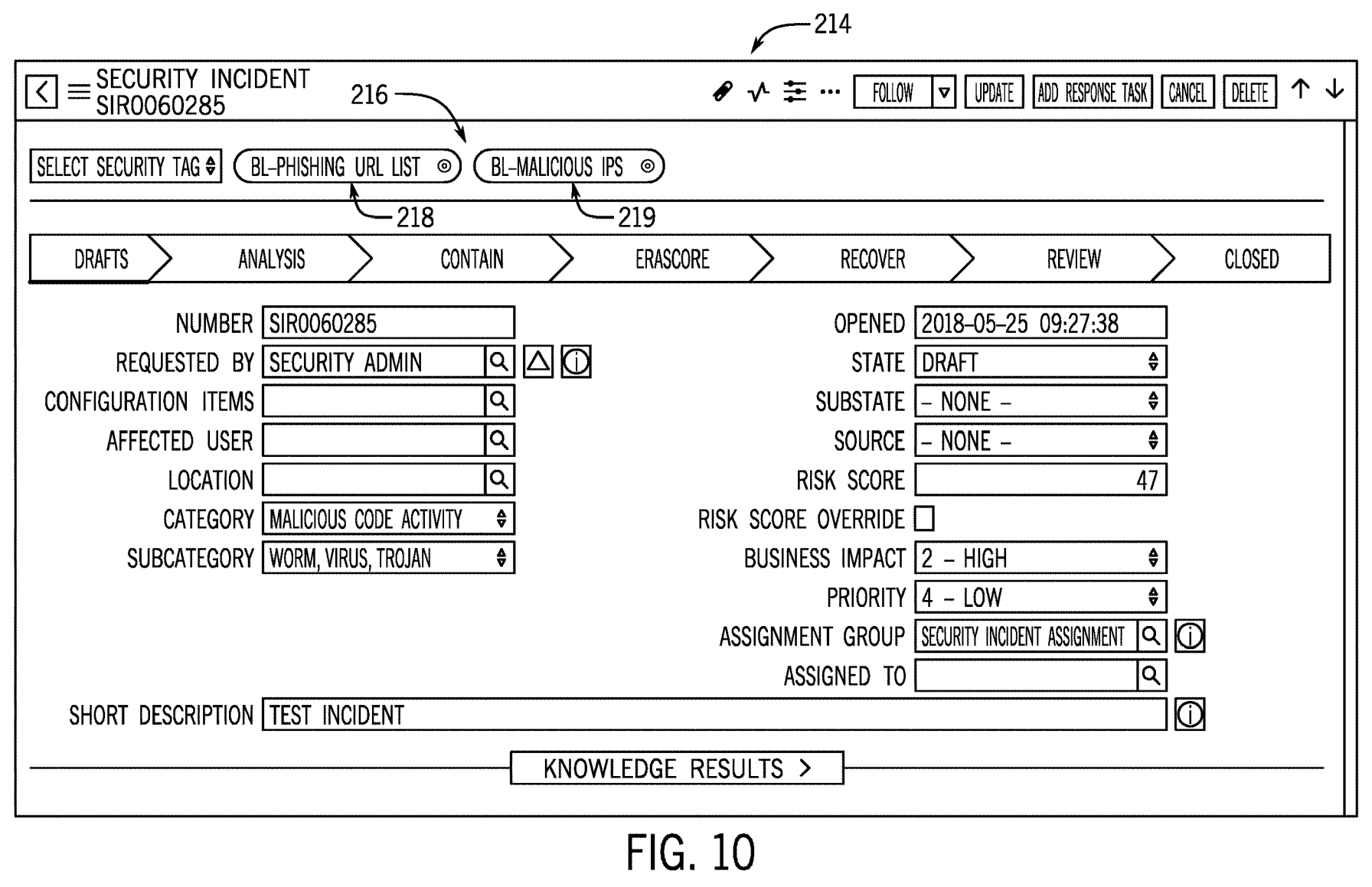

In addition to properly validating and expiring block list entries, in certain embodiments, the disclosed system also offers visual clues (e.g., tags) to notify a user that an incident or observable is associated with a block list entry without requiring the user to drill down through multiple user interface components. As mentioned above with respect to FIG. 5, the block list table 108 includes fields (e.g., "Display tag", "BL tag for observables", "Tagging") that can be used to generate such tags. For example, FIG. 10 illustrates an example of the GUI 214 presenting a security incident that is associated with observables having corresponding block list entries, in accordance with an embodiment. Since the presented security incident is associated with observables that are included in various block list entries, the GUI 214 includes a number of tags 216 that indicate that observables associated with the security incident have been included in block lists. More specifically, the GUI 214 includes a first tag 218 that indicates that a first observable associated with the security incident has been added as an entry in a phishing URL block list, while the second tag 219 indicates that a second observable associated with the security incident has been added as an entry in a malicious IPs block list. Similarly, FIG. 11 illustrates an example of a GUI 220 presenting an observable that is associated with a block list entry, in accordance with an embodiment. In particular, the GUI 220 includes a tag 222 indicating that the observable is associated with an entry in a malicious IPs block list.

Figure 12:
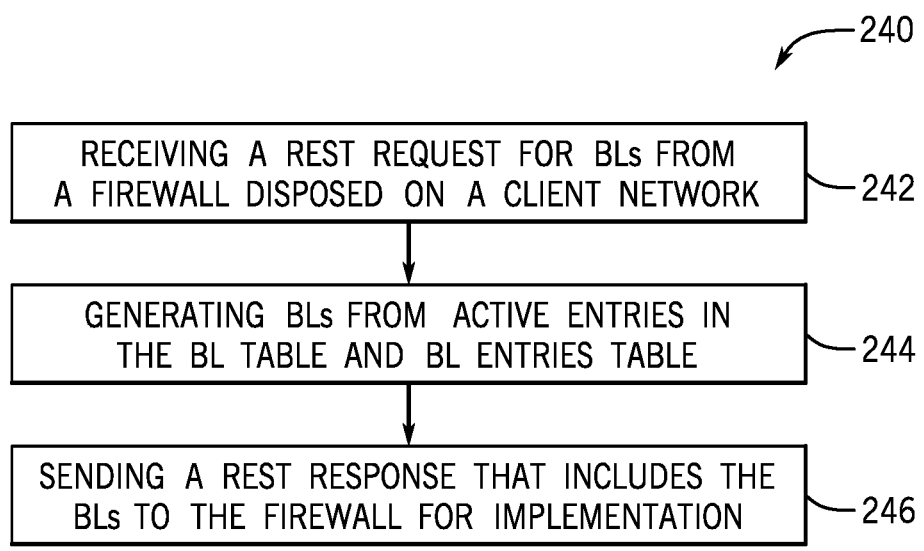
FIG. 12 is a flow diagram illustrating an embodiment of a process whereby block lists are dynamically generated in response to a received request, in accordance with embodiments of the present technique.

FIG. 12 is a flow diagram illustrating an embodiment of a process 240 whereby the client instance 42 dynamically generates block lists in response to the received REST request 126 for block lists. Certain steps of the process 240 are discussed with respect to the block list system 100 of FIG. 4. In certain embodiments, the process 240 may be stored (e.g., as part of the block list engine 102 and/or the client instance 42) as instructions in a memory (e.g., memory 86) and executed by a processor (e.g., processor 82) of a suitable computing system (e.g., data center 22). Additionally, the illustrated process 240 is merely provided as an example, and in other embodiments, the process 240 may include fewer steps, additional steps, and/or steps in different orders than illustrated in FIG. 12.

The illustrated embodiment of the process 240 begins with the client instance 42 receiving (block 242) the REST request 126 for block lists from the firewall 118 disposed on the client network 12. As mentioned with respect to FIG. 4, the REST request 126 may include one or more credentials (e.g., server authentication credentials 128, client authentication credentials 103) to enable the firewall 118 to access the block list endpoint 116 of the client instance 42 via the network 18. In response to receiving the REST request 126, the client instance 42 generates (block 244) the block lists from active entries stored in the block list table 108 and the block list entries table 110. Finally, the process 240 concludes with the client instance 42 sending the REST response 132, includes the generated block lists, to the firewall 118 for implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computing system, comprising:
a memory configured to store a database comprising a block list entries table and an observables table;
a processor configured to execute instructions stored in the memory to perform actions comprising:
creating an entry in the block list entries table to allow or block, on a client network, an observable stored in the observables table;
activating the entry in the block list entries table by:
modifying a value of an "active" field of the entry to true;
modifying a value of a "status" field of the entry to "added";
modifying a value of a "date added" field of the entry to a current date; and
storing a date in an "expired date" field of the entry that is calculated based on the current date and an "expiration period" field storing an integer value; and
receiving a request for a block list from a firewall disposed on the client network and, in response, generating the block list from activated entries in the block list entries table and sending the block list to the firewall, wherein the firewall is configured to allow or block network traffic associated with the observable on the client network in accordance with the block list.

2. The computing system of claim 1, wherein, to create the entry in the block list entries table, the processor is configured to perform actions comprising:
creating the entry as a new record in the block list entries table;
modifying a value of a "retrieval uniform resource locator (URL)" field of the entry to a URL a block list endpoint of a Representational State Transfer (REST) server hosted by the computing system;
modifying the value of the "active" field of the entry to false; and
modifying the value of the "status" field of the entry to "pending".

3. The computing system of claim 1, wherein the processor is configured to perform actions comprising:
comparing a current date to the value of the "expired date" field of the entry and, in response to determining that the current date is beyond the value:
modifying the value of the "active" field of the entry to false; and
modifying the value of the "status" field of the entry to "expired".

4. The computing system of claim 1, wherein the database comprises a block list table, and wherein the processor is configured to perform actions comprising:
creating an entry in the block list table that corresponds to a type of the observable and associating it with the entry in the block list entries table, wherein the type comprises an IP address or range, a uniform resource locator (URL), or a domain.

5. The computing system of claim 1, wherein the processor is configured to perform actions comprising:
receiving information regarding observables detected on a client network and, in response, storing the information in the observables table.

6. The computing system of claim 1, wherein the processor is configured to perform actions comprising:
receiving a request to add the observable to the block list and, in response, creating the entry in the block list table that corresponds to the observable.

7. The computing system of claim 6, wherein the processor is configured to perform actions comprising:
receiving an approval of the request and, in response, activating the entry in the block list table to allow or block subsequent occurrences of the observable on the client network.

8. The computing system of claim 1, wherein the computing system is further configured to host a Representational State Transfer (REST) server, and wherein the request is a REST request, and wherein the block list is sent to the firewall as a REST response.

9. A computer-implemented method, comprising:
adding an entry as a record in a block list entries table and associating the entry with a block list in a block list table and with an observable in an observables table;
activating the entry in the block list entries table to allow or block subsequent occurrences of the observable on a client network by:
modifying a value of an "active" field of the entry to true;
modifying a value of a "status" field of the entry to "added";
modifying a value of a "date added" field of the entry to a current date; and
storing a date in an "expired date" field of the entry that is calculated based on the current date and an "expiration period" field storing an integer value; and
receiving a request for the block list from a firewall disposed on the client network and, in response, generating the block list from activated entries in the block list table and block list entries table and sending the block list to the firewall, wherein the firewall is configured to allow or block network traffic associated with the observable on the client network in accordance with the block list.

10. The method of claim 9, wherein creating the entry comprises:
creating a block list as a new record in a block list table that corresponds to a type of the observable, wherein the type comprises an IP address or range, a uniform resource locator (URL), or a domain;
associating the block list entry in the block list entries table with the block list in the block list table and the observable in the observables table;
modifying a value of a "retrieval uniform resource locator (URL)" field of the entry to a URL a block list endpoint of a Representational State Transfer (REST) server;
modifying the value of the "active" field of the entry to false; and
modifying the value of the "status" field of the entry to "pending".

11. The method of claim 9, wherein activating the entry comprises:
generating a notification that the entry has been added to the block list entries table; and
receiving input from an authorized security role to activate the block list entry.

12. The method of claim 11, wherein activating the entry comprises activating the entry in response to receiving the input from the authorized security role.

13. The method of claim 12, comprising:
after activating the entry, comparing a current date to the value of the "expired date" field of the entry and, in response to determining that the current date is beyond the value:
modifying the value of the "active" field of the entry to false; and
modifying the value of the "status" field of the entry to "expired".

14. The method of claim 9, comprising receiving and storing the observable as a record in the observables table, wherein the observable comprises an IP address or range, a uniform resource locator (URL), or a domain.

15. A non-transitory, computer-readable medium storing instructions executable by a processor of a computing system to host a Representational State Transfer (REST) server and a database, wherein the instructions comprise:
instructions to create an entry in a block list entries table of the database and associate the entry with an observable stored in an observables table of the database, in response to input received from a first authorized security role;
instructions to activate the entry in the block list table, in response to input received from a second authorized security role, wherein the instructions to activate the entry comprise instructions to:
modify a value of an "active" field of the entry to true;
modify a value of a "status" field of the entry to "added";
modify a value of a "date added" field of the entry to a current date; and
store a date in an "expired date" field of the entry that is calculated based on the current date and an "expiration period" field storing an integer value; and instructions to generate a block list from activated entries in the block list table, in response to a REST request from a firewall disposed on the client network, and send the block list to the firewall as a REST response, wherein the firewall is configured to allow or block network traffic associated with the observable on a client network in accordance with the block list.

16. The medium of claim 15, comprising instructions to, before receiving the input from the second authorized security role, generate a notification that is provided to the second authorized security role indicating that the entry has been created in the block list entries table.

17. The medium of claim 15, comprising instructions to validate the entry before creating the entry in the block list entries table.

18. The medium of claim 15, comprising instructions to create a block list in a block list table that corresponds to a type of the observable and associate the block list in the block list table with the entry in the block list entries table, wherein the type comprises an IP address or range, a uniform resource locator (URL), or a domain.

19. The medium of claim 15, wherein the first authorized security role is a security operator and the second authorized security role is a security admin.

* * * * *